(12) United States Patent
Araki et al.

(10) Patent No.: US 9,996,599 B2
(45) Date of Patent: *Jun. 12, 2018

(54) USING ACCESS COUNT OF THE REMOTE SITE TO OPTIMIZE FILE TRANSFER ORDER FOR ASYNCHRONOUS REPLICATION

(71) Applicant: International Business Machines Corporation, Armonk, NY (US)

(72) Inventors: Hiroshi Araki, Tokyo (JP); Sosuke Matsui, Tokyo (JP); Hiroyuki Miyoshi, Tokyo (JP); Satoshi Takai, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/191,253

(22) Filed: Jun. 23, 2016

(65) Prior Publication Data

US 2016/0306865 A1  Oct. 20, 2016

Related U.S. Application Data

(63) Continuation of application No. 14/109,882, filed on Dec. 17, 2013, now Pat. No. 9,378,259.

(30) Foreign Application Priority Data

Dec. 27, 2012 (JP) .................................. 2012-285912

(51) Int. Cl.
*G06F 17/30* (2006.01)
*G06F 11/14* (2006.01)

(52) U.S. Cl.
CPC .... *G06F 17/30575* (2013.01); *G06F 11/1451* (2013.01); *G06F 17/30212* (2013.01)

(58) Field of Classification Search
CPC .................................................. G06F 11/1448
See application file for complete search history.

(56) References Cited

U.S. PATENT DOCUMENTS 7,660,790 B1   2/2010   Batterywala et al.
9,378,259 B2   6/2016   Araki et al.
(Continued)

FOREIGN PATENT DOCUMENTS

JP            06250902 A    9/1994

OTHER PUBLICATIONS

Araki et al., U.S. Appl. No. 14/109,882, filed Dec. 17, 2013.
(Continued)

*Primary Examiner* — Hung Q Pham
(74) *Attorney, Agent, or Firm* — Zilka-Kotab, P.C.

(57) ABSTRACT

According to one embodiment, a system includes a processor and logic integrated with and/or executable by the processor. The logic causes the processor to receive, at a remote site connected to a production site via a network, an incremental file list from the production site, each incremental file indicated by the incremental file list being either updated or new as determined during a time period between a data image at a previous synchronization (sync) point and a data image at a current sync point. The logic also causes the processor to tally a remote access count of each incremental file on the incremental file list received at the remote site by users at the remote site, record the tallied remote access counts in the incremental file list at the remote site, and transfer the incremental file list including the tallied remote access counts to the production site.

17 Claims, 6 Drawing Sheets

(56) References Cited

U.S. PATENT DOCUMENTS

2013/0013561 A1    1/2013   Chan et al.
2013/0151468 A1    6/2013   Wu et al.
2014/0188797 A1    7/2014   Araki et al.

OTHER PUBLICATIONS

Non-Final Office Action from U.S. Appl. No. 14/109,882, dated Aug. 27, 2015.
Final Office Action from U.S. Appl. No. 14/109,882, dated Dec. 31, 2015.
Notice of Allowance from U.S. Appl. No. 14/109,882, dated Mar. 29, 2016.

| File Name | Updated or New | Access Count | | | |
|---|---|---|---|---|---|
| | | Operations Site | | Remote Site | |
| | | Frequency | No. of Users | Frequency | No. of Users |
| File 1 | Updated | 30 | 5 | 10 | 2 |
| File 2 | Updated | 20 | 3 | 10 | 5 |
| File 3 | Updated | 20 | 2 | 30 | 1 |
| File 4 | Updated | 10 | 2 | 40 | 2 |
| File 5 | Newly Created | 5 | 2 | 0 | 0 |
| File 6 | Newly Created | 2 | 1 | 0 | 0 |

FIG. 6

USING ACCESS COUNT OF THE REMOTE SITE TO OPTIMIZE FILE TRANSFER ORDER FOR ASYNCHRONOUS REPLICATION

BACKGROUND

The present invention relates to a method for deciding on the transfer order for data (files) when transferring files from a production site to a remote site in an asynchronous replication function.

Many storage products connected to a network are equipped with an asynchronous replication function to implement a backup and disaster-recovery solution. Scale-out Network Attached Storage (SONAS) from IBM Corp. is also equipped with such an asynchronous replication function. In large-scale storage, such as SONAS, there is a good chance of a failure occurring during data transfers because data transfers take several hours when the amount of updated data is significant, and when the bandwidth of the wide area network (WAN) is narrow, which is common in conventional installations.

In large-scale storage supporting a petabyte (PB) of data, such as SONAS, the execution interval for asynchronous replication is once a day or once every twelve hours for many users. Usually, a remote site has been established at a location some distance from the production site, and the two sites are connected via a WAN. Under these conditions, network delays are often significant. In many cases, data transfer efficiency is improved by performing parallel transfers of different data using multiple node processing. The production site storage is used for read/write operations and the remote site storage is often used as read-only.

When a storage failure occurs at the production site during a data transfer, the data replicated in storage at the remote site becomes the latest backup. However, updated files that were not replicated are lost. When such a failure occurs and a failover is performed to the remote site, all of the files at the remote site may be restored to the state at the most recent synchronization (sync) point. In this method, all updated data at the production site that was updated or added after this sync point is lost.

These storage systems allow for the priority backup of files that are most important to the user in order to minimize damage from data loss that may occur during asynchronous replication. Here, it is necessary to automatically determine that the most frequently updated and referenced files are the files that would cause the most problems for the user if lost.

Laid-Open Japanese Patent Publication No. 6-250902 only focuses on the access count at the production site (the site that is backed up) and selects files for backup when the number of updates exceeds a predetermined value.

However, in Laid-Open Japanese Patent Publication No. 6-250902, access count at remote sites is not taken into account when determining the importance of a file. The access count of a backed up file at a remote site is a useful factor in determining files that are useful to the user.

SUMMARY

In one embodiment, a system includes at least one processor and logic integrated with and/or executable by the at least one processor. The logic is configured to cause the at least one processor to receive, at a remote site connected to a production site via a network, an incremental file list from the production site, each incremental file indicated by the incremental file list being either updated or new as determined during a time period between a data image at a previous synchronization (sync) point and a data image at a current sync point. The logic is also configured to cause the at least one processor to tally a remote access count of each incremental file on the incremental file list received at the remote site by users at the remote site during the time period and record the tallied remote access counts in the incremental file list at the remote site. Moreover, the logic is configured to cause the at least one processor to transfer, from the remote site to the production site, the incremental file list including the tallied remote access counts.

In another embodiment, a method for determining a transfer order of files and replicating files includes creating an incremental file list at a production site, each incremental file indicated by the incremental file list being either updated or new as determined during a time period between a data image at a previous sync point and a data image at a current sync point. The method also includes transferring, from the production site to a remote site, the incremental file list. Also, the method includes tallying a production access count of each incremental file on the incremental file list at the production site by users at the production site during the time period and recording the tallied production access counts in the incremental file list at the production site. Moreover, the method includes receiving, from the remote site, the incremental file list including tallied remote access counts at the remote site. In addition, the method includes converting, under one or more predetermined conditions, the tallied remote access counts in the received incremental file list from the remote site to converted access counts. The method also includes sorting each incremental file on the incremental file list at the production site and the received incremental file list from the remote site in descending order according to a priority determined by one or more second predetermined conditions using the tallied production access counts and the converted access counts to form a sorted incremental file list. Furthermore, the method includes transferring incremental files on the sorted incremental file list, from the production site to the remote site, in order from a top of the sorted incremental file list to a bottom thereof.

According to another embodiment, a computer program product for determining a transfer order of files and replicating files includes a computer readable storage medium having program instructions embodied therewith. The embodied program instructions are executable by at least one processor to cause the at least one processor to create, by the at least one processor, an incremental file list at a production site, each incremental file indicated by the incremental file list being either updated or new as determined during a time period between a data image at a previous sync point and a data image at a current sync point. Also, the embodied program instructions further cause the at least one processor to transfer, by the at least one processor, the incremental file list from the production site to a remote site. Additionally, the embodied program instructions further cause the at least one processor to tally, by the at least one processor, a production access count of each incremental file on the incremental file list at the production site by users at the production site during the time period and record the tallied production access counts in the incremental file list at the production site. In addition, the embodied program instructions further cause the at least one processor to receive, by the at least one processor from the remote site, the incremental file list including tallied remote access counts at the remote site. Moreover, the embodied program instructions further cause the at least one processor to convert, by the at least one processor under one or more predetermined conditions, the tallied remote access counts in the received incremental file list from the remote site to converted access counts. The embodied program instructions also cause the at least one processor to sort, by the at least one processor, each incremental file on the incremental file list at the production site and the received incremental file list from the remote site in descending order according to a priority determined by one or more second predetermined conditions using the tallied production access counts and the converted access counts to form a sorted incremental file list. Furthermore, the embodied program instructions further cause the at least one processor to transfer, by the at least one processor, incremental files on the sorted incremental file list, from the production site to the remote site, in order from a top of the sorted incremental file list to a bottom thereof.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 6 shows an example of a table for a list of incremental files, according to one embodiment.

DETAILED DESCRIPTION

Figure 1:
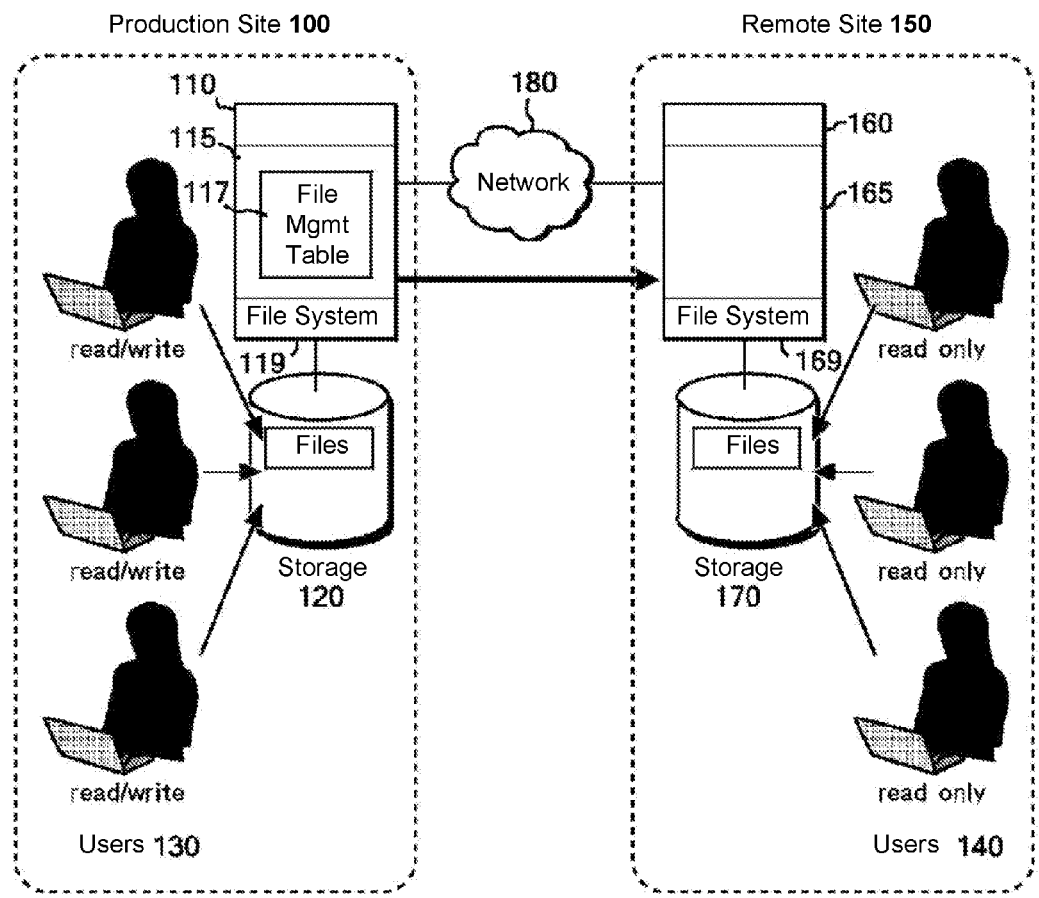
FIG. 1 shows a network storage environment according to one embodiment in which a production site is connected to a remote site.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of a system configured for improved asynchronous replication, as well as operation and/or component parts thereof.

In one general embodiment, a method for determining a transfer order of files and replicating files includes creating a list of incremental files (incremental file list) at a production site, each incremental file indicated by the incremental file list being either updated or new as determined between a data image at a previous synchronization (sync) point and a data image at a current sync point, transferring, from the production site to a remote site, the incremental file list, the remote site being connected to the production site via a network, receiving, at the remote site, the incremental file list from the production site, tallying an access count of each file on the incremental file list by users at the production site and recording the access count tally in the incremental file list, tallying an access count of each file on the incremental file list by users at the remote site and recording the access count tally in the incremental file list, transferring, from the remote site to the production site, the incremental file list including access frequencies at the remote site, receiving, at the production site, the incremental file list including the access frequencies at the remote site from the remote site, sorting each file on the incremental file list including access frequencies at the production site and on the incremental file list including the access frequencies at the remote site in descending order according to converted access frequencies in which the access frequencies at the remote site have been converted to access frequencies at the production site under one or more predetermined conditions, and transferring files, from the production site to the remote site, in order from a top of the sorted incremental file list to a bottom thereof.

In another general embodiment, a system includes a processor and logic integrated with and/or executable by the processor, the logic being configured to: create a list of incremental files (incremental file list) at a production site, each incremental file indicated by the incremental file list being either updated or new as determined between a data image at a previous synchronization (sync) point and a data image at a current sync point, transfer, from the production site to a remote site, the incremental file list, tally an access count of each file on the incremental file list by users at the production site and record the access count tally in the incremental file list, receive, from the remote site, an incremental file list including access frequencies at the remote site, sort each file on the incremental file list including access frequencies at the production site and on the incremental file list including the access frequencies at the remote site in descending order according to converted access frequencies in which the access frequencies at the remote site have been converted to access frequencies at the production site under one or more predetermined conditions, and transfer files, from the production site to the remote site, in order from a top of the sorted incremental file list to a bottom thereof.

According to another general embodiment, a computer program product for determining a transfer order of files and replicating files includes a computer readable computer medium having program code embodied therewith, the program code being configured to: receive, at a remote site connected to a production site via a network, an incremental file list from the production site, tally an access count of each file on the incremental file list by users at the remote site and record the access count tally in the incremental file list, and transfer, from the remote site to the production site, the incremental file list including access frequencies at the remote site.

In one embodiment, the access count of a replicated file at the production site is acquired and reflected in the order for asynchronous replication. In addition, usage at remote sites is taken into account. Furthermore, the access count of backed up files at the remote site is also acquired and reflected in the order for asynchronous replication according to another embodiment. This allows for a method, computer program product, and system configured for determining the transmission order of files from a production site to a remote site in an asynchronous replication function.

In order to determine the transmission order of files from a production site to a remote site in an asynchronous replication function, in network storage that connects a production site including a server and storage and configured to enable a plurality of users to read files in storage to a remote site via a network, the remote site including a server and storage and configured to enable a plurality of users to read files in storage, a method is provided for determining the transfer order of files and replicating files in order to replicate to the remote site any updated files and newly added files at the production site between two points in time as incremental files. This method includes the steps of:

(1) At the production site: creating a list of incremental files (incremental file list), committing data images between two points in time (the previous sync point and the current sync point), determining any updated files and new files from differences in the data images at the previous and current points in time, and creating an incremental file list including file names to enable identification of the files;

(2) At the production site: transferring the incremental file list to the remote site;

(3) At the remote site: receiving the incremental file list from the production site;

(4-1) At the production site: tallying the access count of each file on the incremental file list by users at the production site and recording the tally in the incremental file list;

(4-2) At the remote site: tallying the access count of each file on the incremental file list by users at the remote site and recording the tally in the incremental file list;

(5) At the remote site: transferring to the production site the incremental file list including the access frequencies at the remote site;

(6) At the production site: receiving from the remote site the incremental file list including the access frequencies at the remote site;

(7) At the production site: sorting each file on the incremental file list including the access frequencies at the production site and the incremental file list including the access frequencies at the remote site in descending order according to the priority determined by the predetermined conditions using the access frequencies of both the production and the remote sites; and (8) At the production site: transferring files to the remote site in order from the top of the sorted incremental file list.

Also, in this method, the number of users accessing each file on the incremental file list at the production site is tallied and recorded in Step (4-1), in some approaches, the number of users accessing each file on the incremental file list at the remote site is tallied and recorded in Step (4-2), in some approaches, and the number of accessing users is added under predetermined conditions to calculate the converted access count in Step (7), in some approaches.

In additional embodiments, a method includes the following steps which are performed at the production site:

(1) creating a list of incremental files (incremental file list), committing data images at the previous sync point and the current sync point, determining any updated files and new files from differences in the data images at the previous and current points in time, and creating an incremental file list including file names to enable identification of the files;

(2) transferring the incremental file list to the remote site;

(4-1) tallying the access count of each file on the incremental file list by users at the production site and recording the tally in the incremental file list;

(6) receiving from the remote site an incremental file list including the access frequencies at the remote site in the incremental file list transferred to the remote site in Step (2);

(7) sorting each file on the incremental file list including the access frequencies at the production site and the incremental file list including the access frequencies at the remote site in descending order according to converted access frequencies in which the access frequencies at the remote site have been converted to access frequencies at the production site under predetermined conditions; and (8) transferring files to the remote site in order from the top of the sorted incremental file list.

In another embodiment, a method includes the following steps which are performed at the remote site:

(3) receiving from the production site an incremental file list created at the production site by confirming data images at the two points in time, confirming updated files and new files from the differences in the data images at the two points in time, and including file names to enable identification of the files;

(4-2) tallying the access count of each file on the incremental file list by users at the remote site and recording the tally in the incremental file list; and (5) transferring to the production site the incremental file list including the access frequencies at the remote site.

Also, in this method, the number of users accessing each file on the incremental file list at the production site and the number of users accessing each file on the incremental file list at the remote site may be tallied and recorded, and the number of users may be taken into account under predetermined conditions in calculating the converted access frequencies.

According to yet another embodiment, a server and storage is provided, the server comprising a write control which executes the steps of:

(1) At the production site: creating a list of incremental files (incremental file list), committing data images between two points in time (the previous sync point and the current sync point), determining any updated files and new files from differences in the data images at the previous and current points in time, and creating an incremental file list including file names to enable identification of the files;

(2) At the production site: transferring the incremental file list to the remote site;

(3) At the remote site: receiving the incremental file list from the production site;

(4-1) At the production site: tallying the access count of each file on the incremental file list by users at the production site and recording the tally in the incremental file list;

(4-2) At the remote site: tallying the access count of each file on the incremental file list by users at the remote site and recording the tally in the incremental file list;

(5) At the remote site: transferring to the production site the incremental file list including the access frequencies at the remote site;

(6) At the production site: receiving from the remote site the incremental file list including the access frequencies at the remote site;

(7) At the production site: sorting each file on the incremental file list including the access frequencies at the production site and the incremental file list including the access frequencies at the remote site in descending order according to the priority determined by the predetermined conditions using the access frequencies of both the production and the remote sites; and (8) At the production site: transferring files to the remote site in order from the top of the sorted incremental file list.

In another embodiment, a computer program product is provided which executes and causes a server to perform the steps of:

(1) At the production site: creating a list of incremental files (incremental file list), committing data images between two points in time (the previous sync point and the current sync point), determining any updated files and new files from differences in the data images at the previous and current points in time, and creating an incremental file list including file names to enable identification of the files;

(2) At the production site: transferring the incremental file list to the remote site;

(3) At the remote site: receiving the incremental file list from the production site;

(4-1) At the production site: tallying the access count of each file on the incremental file list by users at the production site and recording the tally in the incremental file list;

(4-2) At the remote site: tallying the access count of each file on the incremental file list by users at the remote site and recording the tally in the incremental file list;

(5) At the remote site: transferring to the production site the incremental file list including the access frequencies at the remote site;

(6) At the production site: receiving from the remote site the incremental file list including the access frequencies at the remote site;

(7) At the production site: sorting each file on the incremental file list including the access frequencies at the production site and the incremental file list including the access frequencies at the remote site in descending order according to the priority determined by the predetermined conditions using the access frequencies of both the production and the remote sites; and (8) At the production site: transferring files to the remote site in order from the top of the sorted incremental file list.

In the network storage system according to one embodiment, the most important data (as determined according to any known algorithm, selection, determination, etc.) may be quickly backed up by reflecting not only the access history of the production site, but also the access history of the remote site. By quickly backing up important files, damage from data loss that may occur during asynchronous replication may be minimized.

The following is an explanation of particular embodiments (examples) of the present invention. In essence, these embodiments describe a novel method for deciding the order of files (data) to be transferred from a production site to a remote site in an asynchronous replication function. In various embodiments, the transferred file order takes into account the operational conditions at the remote site in addition to that of the production site by acquiring the access count of backup files at the remote site and reflecting this in the order for asynchronous replication.

FIG. 1 shows a network storage environment according to one embodiment in which a production or operations site 100 is connected to a remote site 150. The production site 100 and remote site 150 provide storage services and are connected to each other via an external network 180. The external network 180 may comprise a WAN, a local area network (LAN), or any other suitable type of network known in the art. The production site 100 includes storage 120 connected to a storage server 110. The data stored in the storage 120 may include files or data sets that are written and read by a plurality of users 130. The storage server 110 includes memory 115 (e.g., RAM, DRAM, Flash, SSD, etc.) and a file system 119 on the server configured to control the reading and writing of files to the storage 120. Similarly, the remote backup site (remote site) 150 includes storage 170 connected to a storage server 160, and a plurality of users 140 may read and/or write the files stored in the storage 170. The storage server 160 includes memory 165 (e.g., RAM, DRAM, Flash, SSD, etc.), and a file system 169 on the server 160 configured to control the reading and/or writing of files to the storage 170.

The production site 100 periodically, and/or in case of an emergency situation, is configured to back up files to the remote site 150. At the production site 100, the file names recorded at a given point in time (sync point) are managed using a file management table 117. More specifically, updated files and newly added files are extracted at two points in time from the file management table and managed on a list of incremental files.

Figure 2:
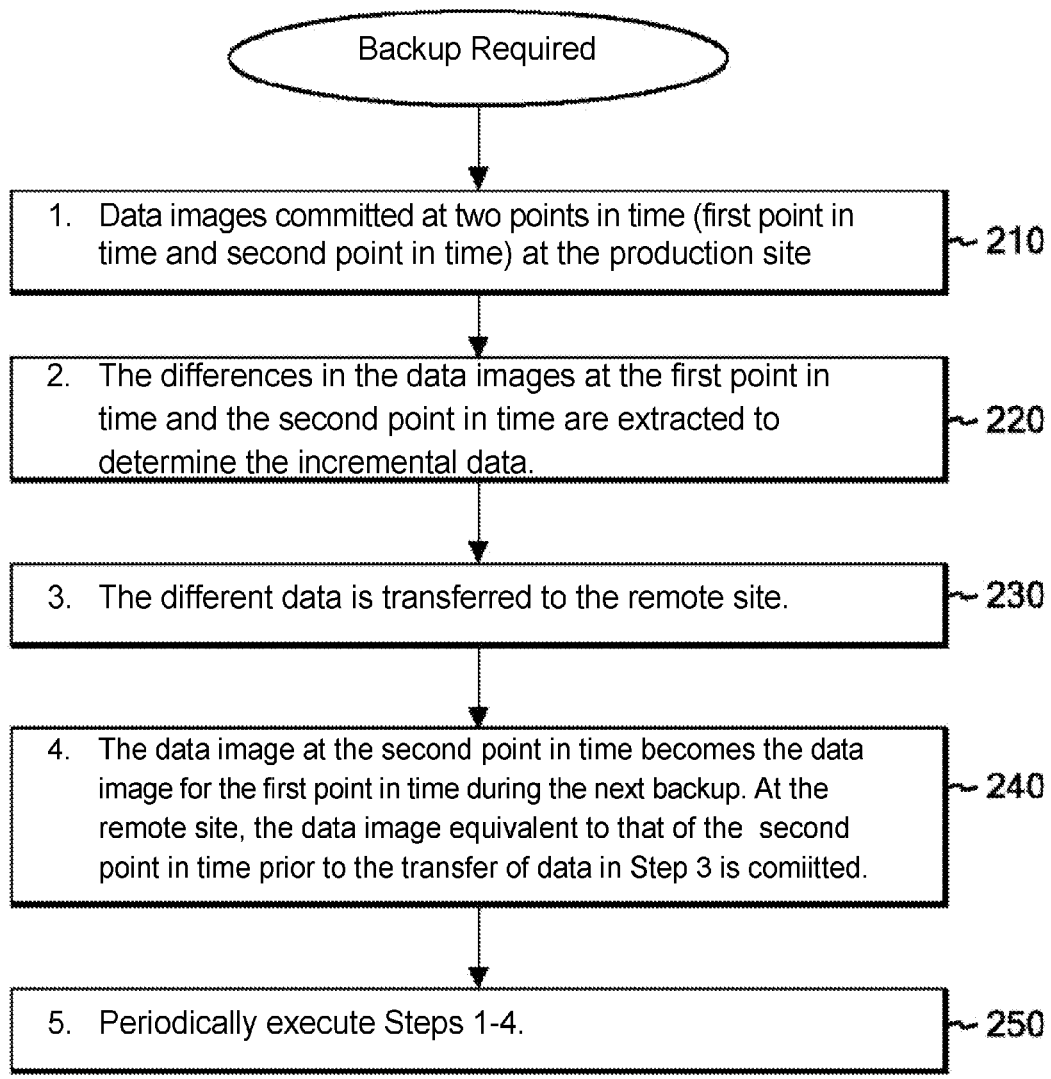
FIG. 2 shows a conventional flow in asynchronous replication performed between two storage sites to back up data.

FIG. 2 shows a conventional flow in asynchronous replication performed between two storage sites to back up data. One embodiment relates to the order in which conventional incremental data (e.g., incremental files) is transferred from a production site to a remote site. Therefore, in the flow of operations for incremental data, the production site periodically detects the need for backup of data. When a failure occurs, data may be restored at the remote site up to the last sync point. Also, the detection of a failure includes confirmation of the data image at the last sync point (the second sync point in the following example), and confirmation of the incremental data, in this embodiment.

In Step 1 (210): At the production site, the data images at two points in time (a first point in time and a second point in time) are committed. At the production site, the data image (of files in storage) at a given point in time (sync point) are listed in a file management table. The file management table at the first and second points in time are compared, and files updated or newly added between the two sync points are managed on an incremental file list.

In Step 2 (220): Any differences in the data images at the first and second points in time are extracted, and the incremental data is committed.

In Step 3 (230): The incremental data is transferred to the remote site.

In Step 4 (240): The data image at the second point in time becomes the data image at the first point in time during the next backup. The data image is committed at the remote site at the second point in time before the transmission in Step 3. The data image at the second point in time becomes the data image at the first sync point during the next backup.

In Step 5 (250): Steps 1-4 are repeated periodically, as needed, in response to an event occurring, due to user demand, etc.

Figure 3:
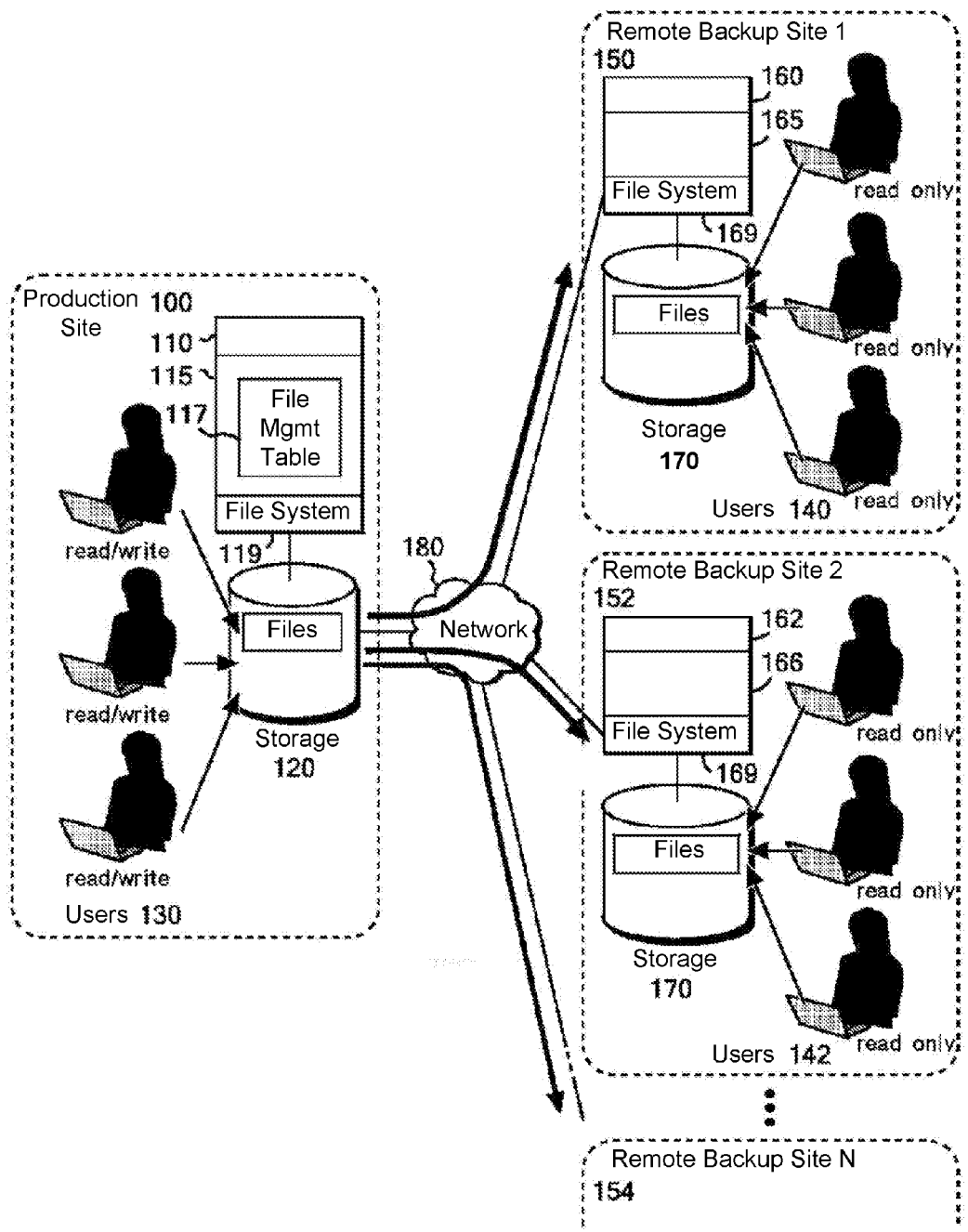
FIG. 3 shows a network storage environment according to one embodiment in which a production site is connected to a plurality of remote backup sites.

FIG. 3 shows a network storage environment according to one embodiment in which a production site 100 (or operations site) is connected to a plurality of remote backup sites. This storage network is the same as the one in FIG. 1 except that there is more than one remote backup site. The production site 100 and remote site 150 provide storage services and are connected to each other via an external network 180. The production site 100 includes storage 120 connected to a storage server 110. The data stored in the storage 120 includes files that are written and read by a plurality of users 130. The storage server 110 includes memory 115 (e.g., RAM, DRAM, Flash, SSD, etc.), and a file system configured to control the reading and writing of files to the storage 120. Similarly, the remote sites 150, 152, 154, etc., include storage 170 connected to storage servers 160, 162, etc., and a plurality of users 140, 142 that are able to read the files stored in the storage 170, but not write thereto (read-only).

The production site 100 periodically or according to some other timeframe (such as in emergency situations) backs up files to the remote sites. At the production site 100, the file names recorded at a given point in time are managed using a file management table 117 (File Mgmt Table). More specifically, updated files and newly added files are extracted from the file management table 117 at two points in time and managed on a list of incremental files.

When there is a plurality of remote sites, network storage (not shown) may also be included in one embodiment. As the number of remote sites increases, a shift in the trend may be anticipated towards determining the importance of each file at a production site using the access count to the file and the number of users accessing the file at a remote site. In one embodiment, the importance of each file on a new list of incremental files takes into account a frequency of access to the file not only at the production site 100 but also at a plurality of remote sites 150, 152, 154, etc.

Figure 4:
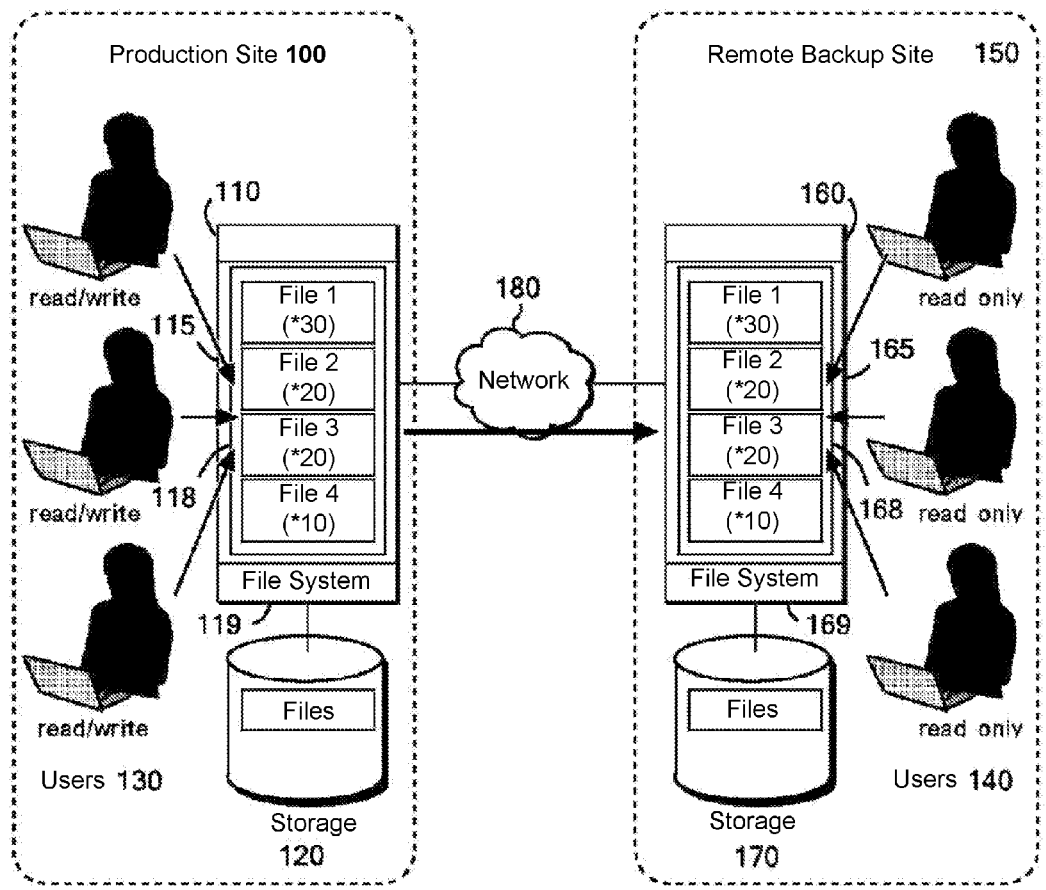
FIG. 4 shows an example of the lists of incremental files at two storage sites in network storage which include a tally of the access count at both sites, according to one embodiment.

FIG. 4 shows an example of the lists of incremental files at two storage sites in network storage which include a tally of the access count at both sites. The network storage configuration shown in FIG. 4 is the same as that of FIG. 1. In FIG. 4, the server 110 at the production site 100 and the server 160 at a remote site 150 have file management tables 118, 168 in memory 115, 165, respectively, and establish incremental file lists. The production site 100 periodically, or in emergency situations, backs up files to the remote sites. At the production site 100, the file names recorded at a given point in time are managed using a file management table 118. More specifically, updated files and newly added files are extracted from the file management table 118 at two points in time (sync points) and managed on a list of incremental files.

The incremental file list stored in memory 115 created at the production site 100 is transferred to the remote site 150 and stored in memory 165 there. At the production site 100, the access count and number of accessing users are tallied and recorded for each file on the incremental file list. At the remote site and in parallel, the access count and number of accessing users are tallied and recorded for each file on the incremental file list. The incremental file list including the access count at the remote site 150 is returned to the production site 100, and an access count (converted access count) is calculated at the production site 100 based on the access count at the production site 100 and the access count at the remote site 150. A higher converted access count indicates a more important file, and each file on the incremental file list is sorted based on this degree of importance, or some other suitable characteristic. The order for transferring files to remote sites is described in detail in the file transmission order decision flow shown in FIG. 5, according to one embodiment. The access count at the remote site 150 is the access count of each backup file at the remote site 150 from the previous sync point to the current sync point. In the acquisition method, when a backup file is already at the remote site 150, a larger access count since the previous sync point indicates that users at the remote site 150 find the file to be more important, so the priority is increased.

Figure 5:
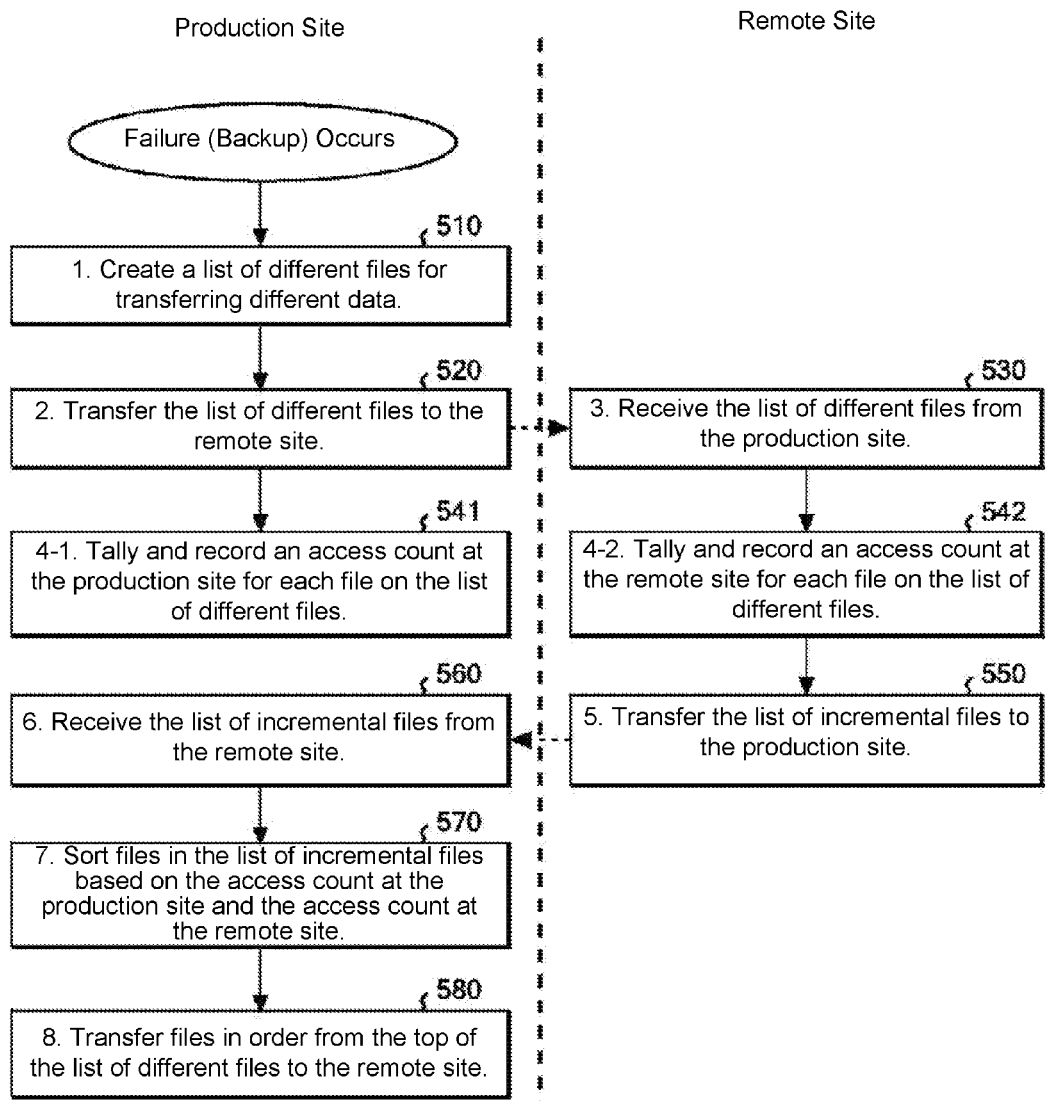
FIG. 5 shows a decision flow for transfer order that may be used, in one embodiment.

FIG. 5 shows a decision flow for transfer order used in one embodiment. During periodic backup or an emergency failure, the need may occur to replicate incremental files at a remote site. In this example, the transfer order decision method uses the technique described above. Steps 1-8 have been divided in the drawing by a dotted line to differentiate the steps performed by the production site and by a remote site.

In Step 1 (510), which is performed at the production site: an incremental file list is created to transfer incremental files (incremental data) to the remote site. A typical example of an incremental file list is shown in FIG. 6, according to one embodiment. The incremental files (incremental data) are in a file management table (118, FIG. 4) including the names of files that were updated or newly added at the production site between two points in time.

Referring again to FIG. 5, in Step 2 (520), which is performed at the production site: the created incremental file list is transferred to the remote site.

In Step 3 (530), which is performed at the remote site: the remote site receives the created incremental file list from the production site.

In Step 4-1 (541) which is performed at the production site: the access count at the production site is tallied and recorded for each file on the incremental file list. Because many different users use the storage at the production site (read/write access), the number of unique users is tallied and recorded along with the access count in one approach. FIG. 6 shows an example in which the access count and number of users at the production site have been tallied and recorded.

Referring again to FIG. 5, in Step 4-2 (542), which is performed at the remote site: the access count at the remote site is tallied and recorded for each file on the incremental file list. Because many different users use the storage at the remote site (read access), the number of unique users is tallied and recorded along with the access count. FIG. 6 shows an example in which the access count and number of users at the remote site have been tallied and recorded.

Referring again to FIG. 5, in Step 5 (550), which is performed at the remote site: the remote site transfers the incremental file list including the access count and the number of accessing users to the production site.

In Step 6 (560), which is performed at the production site: the operations site receives the incremental file list including the access count and the number of accessing users at the remote site.

In Step 7 (570), which is performed at the production site: the production site sorts the files in the file list based on the access count at both the production site and the remote site. In this step, the production site determines the converted access count using one of the following methods, and sorts the files on the incremental file list.

In a first example, the files on the incremental file list may be sorted by importance in descending order based on the sum of the access counts at both the production site and the remote site.

In a second example, the files on the incremental file list may be sorted by importance in descending order based on the sum of the access count at the production site and a weighted access count at the remote site (for example, ½, ¼, etc.).

In a third example, the files on the incremental file list may be sorted in descending order based on the access count at the remote site when the access count at the production site is in the same access count range.

In a fourth example, the files on the incremental file list may be sorted by importance in descending order based on the sum of the total in the first example and a weighting (for example, 2, 4, etc.) of the number of accessing users at both sites.

In yet another example, the files on the incremental file list may be sorted in descending order based on the sum of the access counts at both the production site and the remote site as in the first example. For the files that are in the same access count range, they are sorted in the descending order based on the number of accessing users at both sites.

In one embodiment, the weighting may be selected based on the number of users and by considering the importance of the user activities at production and the remote sites.

In Step 8 (580), which is performed at the production site: the production site transfers the files on the incremental file list to the remote site from the top in descending order based on the converted access count determined in Step 7.

The decision flow for the transfer order in this embodiment includes the access count or number of accessing users at the remote site instead of information only from the production site. Also, when the priority of the production site and remote site are different, the priority of the remote site may be included when the converted access count is set at the production site. Also, because newly created files have not been backed up at the remote site, the priority may be raised at the remote site when the converted access count is provided at the production site.

Two file transfer methods may be used in Step 8 (580). The first transfer method is used to transfer files one at a time in sequential order in order to absolutely guarantee the order. The second transfer method performs data transfers via parallel processing to improve data transfer performance while also maintaining the order of the incremental file list (as much as possible).

In the second method, the incremental file list is divided into small units from the top, sent in order to multiple processors, and processed in parallel. The next unit of the list is processed by the processor that has completed its portion. For example, when an incremental file list is divided into ten units from the top and processed in parallel by five processors, units one through five are assigned to processors one through five, and the parallel processing is started. The sixth unit is assigned to the processor that has finished processing, and the seventh unit is assigned to the next processor that has finished. This method cannot strictly maintain the order of the incremental file list, but can perform parallel transfers while maintaining the order as well as possible.

FIG. 6 shows an incremental file list table according to one embodiment. The incremental file list tables extracted from the file management tables (118, 168, FIG. 4) are extractable from the file management table (117, FIG. 1) used in the prior art. Referring again to FIG. 6, the file name column lists the existing files that were updated and the files that were newly recorded at the production site between two different points in time. Files 1-4 are updated. Files 5 and 6 are newly recorded files in the storage at the production site. The access count for each file is tallied and recorded at both the production site and the remote site. At the same time, the number of unique users is tallied and recorded for each file. The operations site and remote sites may be prioritized in the incremental file list.

Of course, many other arrangements for storing such data are possible, and may be used in conjunction with the other embodiments described herein, as would be appreciated by one of skill in the art upon reading the present descriptions.

In the network storage system used in the examples described above, the access counts, number of accessing users, and priorities are acquired at the production site and the remote sites. Because the order is decided using weighting and the number of users, the importance of data to users can be more accurately identified. By replicating very important data as soon as possible in the backup process, the impact of the data loss can be minimized even when a failure occurs during data replication. The present invention was explained above with reference to embodiments (examples), but the scope of the present invention is not limited to these examples. It should be readily be apparent to those skilled in the art that various modifications and alterations can be made without departing from the spirit and scope of the present invention.

In summation, embodiments described herein provide a method for determining the transmission order of files from a production site to a remote site in asynchronous replication. The method includes the steps of: (1) committing data images at the previous sync point and the current sync point, determining updated files and new files based on the differences in the data images at the previous and current points in time, and creating a list of incremental files (incremental file list), including file names to enable identification of the files; (2) transferring the incremental file list to the remote site; (3) receiving the incremental file list from the production site; (4-1) tallying the access count of each file on the incremental file list at the production site (the accesses are done by the users at the production site) and recording the tally in the incremental file list; (4-2) tallying the access count of each file on the incremental file list at the remote site (the accesses are done by the users at the remote site) and recording the tally in the incremental file list; (5) transferring to the production site the incremental file list including the access frequencies at the remote site; (6) receiving from the remote site the incremental file list including the access frequencies at the remote site; (7) sorting each file on the incremental file list including the access frequencies at the production site and the incremental file list including the access frequencies at the remote site in descending order according to the priority determined by the predetermined conditions using the access frequencies of both the production and the remote sites; and (8) transferring files to the remote site in order from the top of the sorted incremental file list. This replication method may be used to quickly back up the most important files by also reflecting the access history at the remote site.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A system, comprising:
   at least one processor and logic integrated with and/or executable by the at least one processor, the logic being configured to cause the at least one processor to:
   receive, at a remote site connected to a production site via a network, an incremental file list from the production site, each incremental file indicated by the incremental file list being either updated or new as determined during a time period between a data image at a previous synchronization (sync) point and a data image at a current sync point;
   tally a remote access count of each incremental file on the incremental file list received at the remote site by users at the remote site during the time period and record the tallied remote access counts in the incremental file list at the remote site; and
   transfer, from the remote site to the production site, the incremental file list including the tallied remote access counts.

2. The system as recited in claim 1, wherein the incremental file list includes file names of the incremental files.

3. The system as recited in claim 1, wherein the logic is further configured to cause the at least one processor to:
create the incremental file list at the production site, wherein the incremental file list includes only new and/or updated files as determined during the time period;
transfer, from the production site to the remote site, the incremental file list; and
receive, at the production site, the incremental file list from the remote site.

4. The system as recited in claim 3, wherein incremental files on the incremental file list created at the production site are updated files and new files that are confirmed according to one or more differences in the data images at the previous sync point and at the current sync point.

5. The system as recited in claim 3, wherein the logic is further configured to cause the at least one processor to:
tally a production access count of each incremental file on the incremental file list at the production site by users at the production site during the time period and record the tallied production access counts in the incremental file list at the production site;
convert, under one or more predetermined conditions, the tallied remote access counts in the received incremental file list from the remote site to converted access counts;
sort each incremental file on the incremental file list at the production site and the received incremental file list from the remote site in descending order according to a priority determined by one or more second predetermined conditions using the tallied production access counts and the converted access counts to form a sorted incremental file list; and
transfer incremental files of the sorted incremental file list, from the production site to the remote site, in order from a top of the sorted incremental file list to a bottom thereof.

6. The system as recited in claim 1, wherein the logic is further configured to cause the at least one processor to tally and record a number of users accessing each incremental file on the incremental file list at the remote site.

7. A method for determining a transfer order of files and replicating files, the method comprising:
creating a list of incremental files (incremental file list) at a production site, each incremental file indicated by the incremental file list being either updated or new as determined during a time period between a data image at a previous synchronization (sync) point and a data image at a current sync point;
transferring, from the production site to a remote site, the incremental file list;
tallying a production access count of each incremental file on the incremental file list at the production site by users at the production site during the time period and recording the tallied production access counts in the incremental file list at the production site;
receiving, from the remote site, the incremental file list including tallied remote access counts at the remote site of incremental files indicated by the incremental file list;
converting, under one or more predetermined conditions, the tallied remote access counts in the received incremental file list from the remote site to converted access counts;
sorting each incremental file on the incremental file list at the production site and the received incremental file list from the remote site in descending order according to a priority determined by one or more second predetermined conditions using the tallied production access counts and the converted access counts to form a sorted incremental file list; and
transferring incremental files on the sorted incremental file list, from the production site to the remote site, in order from a top of the sorted incremental file list to a bottom thereof.

8. The method as recited in claim 7, wherein a number of users accessing each incremental file on the incremental file list at the production site and a number of users accessing each incremental file on the incremental file list at the remote site are tallied and recorded.

9. The method as recited in claim 7, wherein the incremental files on the incremental file list created at the production site are updated files and new files that are confirmed according to one or more differences in the data images at the previous sync point and at the current sync point.

10. The method as recited in claim 7, further comprising enabling a plurality of users to read files in a storage hosted by a server of the production site, and wherein the sorted incremental file list includes file names of the incremental files.

11. The method as recited in claim 7, further comprising:
enabling a plurality of users to read files in a second storage hosted by a second server of the remote site
receiving, at the remote site, the incremental file list from the production site;
tallying a remote access count of each incremental file on the incremental file list during the time period by users at the remote site and recording the tallied remote access counts in the incremental file list from the production site; and
transferring, from the remote site to the production site, the incremental file list including the tallied remote access counts.

12. A computer program product for determining a transfer order of files and replicating files, the computer program product comprising a computer readable storage medium having program instructions embodied therewith, the embodied program instructions being executable by at least one processor to cause the at least one processor to:
create, by the at least one processor, a list of incremental files (incremental file list) at a production site, each incremental file indicated by the incremental file list being either updated or new as determined during a time period between a data image at a previous synchronization (sync) point and a data image at a current sync point;
transfer, by the at least one processor, the incremental file list from the production site to a remote site;
tally, by the at least one processor, a production access count of each incremental file on the incremental file list at the production site by users at the production site during the time period and record the tallied production access counts in the incremental file list at the production site;
receive, by the at least one processor from the remote site, the incremental file list including tallied remote access counts at the remote site of incremental files indicated by the incremental file list;
convert, by the at least one processor under one or more predetermined conditions, the tallied remote access counts in the received incremental file list from the remote site to converted access counts;
sort, by the at least one processor, each incremental file on the incremental file list at the production site and the received incremental file list from the remote site in descending order according to a priority determined by one or more second predetermined conditions using the tallied production access counts and the converted access counts to form a sorted incremental file list; and transfer, by the at least one processor, incremental files on the sorted incremental file list, from the production site to the remote site, in order from a top of the sorted incremental file list to a bottom thereof.

13. The computer program product as recited in claim 12, wherein a number of users accessing each incremental file on the incremental file list at the production site and a number of users accessing each incremental file on the incremental file list at the remote site are tallied and recorded.

14. The computer program product as recited in claim 12, wherein the incremental files on the incremental file list created at the production site are updated files and new files that are confirmed according to one or more differences in the data images at the previous sync point and at the current sync point.

15. The computer program product as recited in claim 12, wherein the embodied program instructions further cause the at least one processor to enable, by the at least one processor, a plurality of users to read files in a storage hosted by a server of the production site.

16. The computer program product as recited in claim 12, wherein the sorted incremental file list includes file names of the incremental files.

17. The computer program product as recited in claim 12, wherein the embodied program instructions further cause the at least one processor to:

enable, by the at least one processor, a plurality of users to read files in a second storage hosted by a second server of the remote site receive, by the at least one processor at the remote site, the incremental file list from the production site;

tally, by the at least one processor, a remote access count of each incremental file on the incremental file list during the time period by users at the remote site and record the tallied remote access counts in the incremental file list from the production site; and transfer, by the at least one processor from the remote site to the production site, the incremental file list including the tallied remote access counts.

\* \* \* \* \*